United States Patent [19]

Takegawa et al.

[11] 3,748,562

[45] July 24, 1973

[54] FEED CONTROL APPARATUS HAVING A GAUGING DEVICE FOR A NUMERICALLY CONTROLLED MACHINE TOOL

[75] Inventors: Hiroyasu Takegawa; Shiro Seki, both of Kariya, Japan

[73] Assignee: Toyoda Koki Kabushiki Kaisha, Kariya-shi, Japan

[22] Filed: July 14, 1971

[21] Appl. No.: 162,345

[30] Foreign Application Priority Data

July 18, 1970 Japan.............................. 45/63079

[52] U.S. Cl.................. 318/572, 318/594, 318/579
[51] Int. Cl. ........................................... G05b 19/24
[58] Field of Search................... 318/566, 572, 579, 318/443, 594

[56] References Cited
UNITED STATES PATENTS

| | | | |
|---|---|---|---|
| 3,628,002 | 12/1971 | Meese............................ | 318/572 X |
| 2,735,975 | 2/1956 | Gallimore.......................... | 318/443 |
| 3,605,531 | 9/1971 | Izumi et al...................... | 318/572 X |

*Primary Examiner*—T. E. Lynch
*Attorney*—Norman F. Oblon, Marvin J. Spivak et al.

[57] ABSTRACT

In a numerically controlled machine tool a feed control apparatus is provided which includes a gauging means for controlling the movement of a movable component, such as a wheel head or a work table, of the machine tool. Control means are coupled to a numerical control means of the numerically controlled machine tool and to the gauging means. The control means will enable a shifting of the numerical control means from a numerical control mode to a jog mode for allowing a miscellaneous function to be performed and from a jog mode to a numerical control mode after a sizing signal is generated by the gauging means whereby the tool is first moved in a coarse numerical mode to a preset position, then the workpiece is gauged while the system is in the jog mode, and finally switched back to a fine numerical control for final machining with a resultant saving in the amount of numerical information required.

8 Claims, 5 Drawing Figures

INVENTORS
HIROYASU TAKEGAWA
SHIRO SEKI

BY Oblon, Fisher & Spivak
ATTORNEYS

FEED CONTROL APPARATUS HAVING A GAUGING DEVICE FOR A NUMERICALLY CONTROLLED MACHINE TOOL

BACKGROUND OF THE INVENTION

1. Field Of The Invention

The present invention relates to a feed control apparatus which enables a tape or numerical control mode of operation of a numerical control means to change to a jog mode of operation so as to control the feeding movement of a movable component in accordance with a sizing signal transmitted from a gauging means.

2. Description Of The Prior Art

In the conventional numerically controlled machine tool, the feeding movement of a movable component, such as a wheel head or a work table, of the machine tool has been controlled by a numerical control system in accordance with numerical information which has been stored on a permanent record. In the past, it has thereby been impossible to automatically stop the feeding movement in accordance with a signal from a gauging device before the movable component has been moved in an amount corresponding to the numerical information. In a numerically controlled machine tool, and especially of the grinding machine type, very precise dimension accuracy is required. Moreover, because of grinding wheel wear and thermal deformation of the machine it has been almost impossible to significantly improve the dimension accuracy if the movable component thereof, such as a grinding wheel head, is controlled only numerically. As a result of the above, a necessity existed for the utilization of a gauging device together with the numerical control system.

In a prior art numerically controlled grinding machine having a gauging device, a wheel head is slidably mounted on a slide table which in turn is slidably carried on a base. The wheel head is moved by a first feed means that is responsive to feed command pulses from a numerical control system, and the slide table is moved by a second feed means which includes a hydraulic cylinder. The wheel head is retracted, when the slide table is moved in a backward direction by the second feed means in accordance with a sizing signal generated by the gauging device. While somewhat satisfactory, in the prior art numerically controlled grinding machine as described above, two feed means must be provided in order to move a single wheel head. Such a double slide structure is extremely complicated and will, in fact, cause the endurance and accuracy of the machine to reduce. Moreover, since the double slide structure can be utilized for the wheel head, but not for a work table supporting a workpiece thereon, it has been found to be rather difficult to precisely position an end surface of a workpiece relative to the grinding wheel.

SUMMARY OF THE INVENTION

Accordingly, it is an object of the present invention to provide a new and improved unique feed control apparatus which enables numerical control means to change from a numerical control mode to a jog mode in accordance with numerical information and from a jog mode to a numerical control mode in accordance with a sizing signal transmitted from a gauging means.

Another object of the present invention is the provision of a new and improved unique feed control apparatus which causes numerical control means to generate feed command pulses for moving a movable component.

A further object of the present invention is the provision of a new and improved unique feed control apparatus which causes numerical control means to generate feed command pulses at a high frequency in accordance with numerical information and at a low frequency in accordance with a first sizing signal transmitted from a gauging means and to stop said feed command pulses in accordance with a second sizing signal.

Yet a further object of this invention is to provide a new and improved unique feed control apparatus having a gauging device for a numerically controlled machine tool which is of relatively long endurance and inexpensive.

Briefly, in accordance with this invention, these and other objects are in one aspect attained by the provision of a feed control apparatus for a numerically controlled machine tool which includes a gauging device which has a feeler means for making contact with a workpiece and which will generate a sizing signal when the feeler means moves to a desired position. A control device is coupled to the gauging means and to a numerical control means which controls the machine tool and includes a switchover means for changing from a tape or numerical control mode to a jog mode for performing a miscellaneous function in accordance with numerical information and from a jog mode to a tape or numerical control mode in accordance with the sizing signal transmitted from the gauging device. Feed means are further provided for causing the numerical control means to generate feed command pulses for moving a movable component of the machine tool in accordance with the numerical information and to stop generating the feed command pulses in accordance with the sizing signal.

DESCRIPTION OF THE DRAWINGS

The foregoing and other objects of the present invention will become fully apparent from the following detailed description of a preferred embodiment of the present invention with reference to the accompanying Drawings in which.

DETAILED DESCRIPTION OF THE PREFERRED EMBODIMENT

Figure 1:
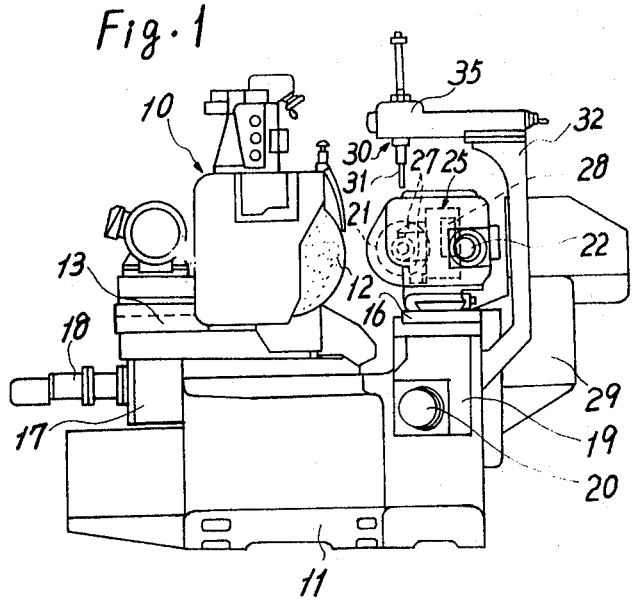
FIG. 1 is a side view of a numerically controlled grinding machine having a gauging device.
Figure 2:
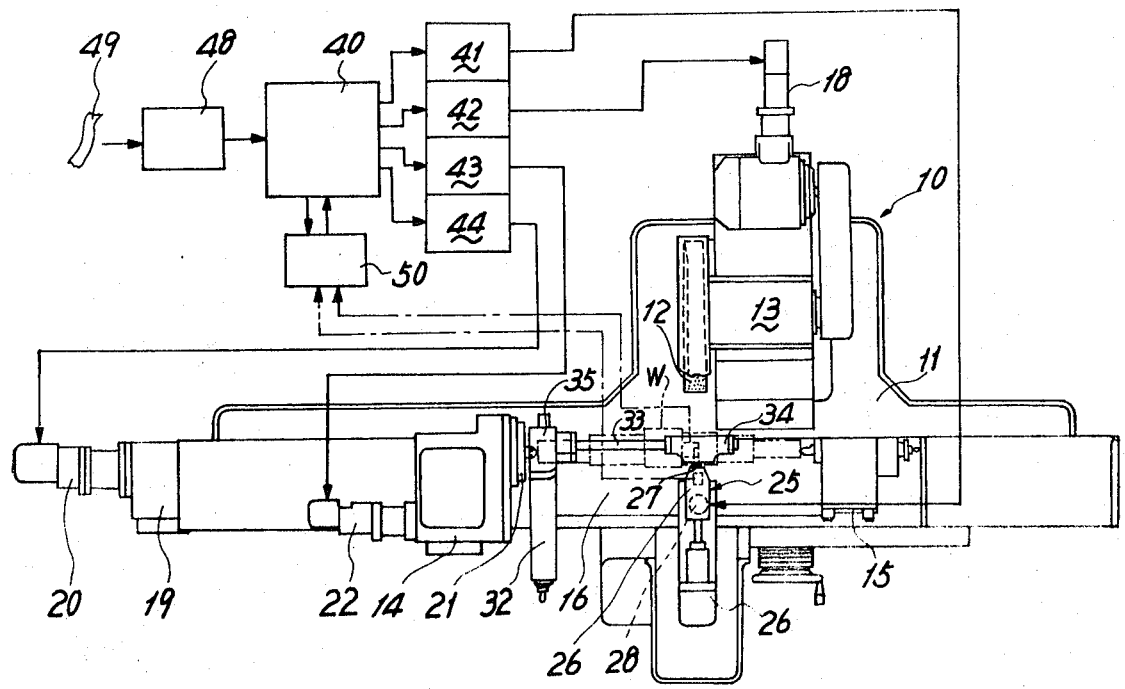
FIG. 2 is a plan view of the machine of FIG. 1 with a block diagram illustrating a numerical control system.

Referring now to the Drawings, wherein like reference numerals designate identical or corresponding parts throughout the several views, and more particularly to FIGS. 1 and 2 thereof, wherein a numerically controlled grinding machine 10 is shown as including a bed 11 upon which a wheel head 13 and a work table 16 are slidably mounted. The Wheel head 13 rotatably supports a grinding wheel 12, and the work table 16 carries a spindle head 14 and a tail stock 15. The wheel head 13 and the work table 16 are slidable in directions which are respectively perpendicular to each other. A feeding screw, not shown, engaged with a nut secured to the wheel head 13 is rotatably mounted on the bed 11, and one end of the screw is connected to a servomotor 18 which is responsive to feed command pulses by way of a speed reducer 17. Likewise, another feeding screw engaged with another nut secured to the work table 16 is connected to a servomotor 20 by way of a speed reducer 19. A spindle 21 is rotatably carried on the spindle head 14 and is driven by a servomotor 22. A workpiece W is supported between the centers of the spindle head 14 and the tail stock 15, and the rotation of the spindle 21 is transmitted thereto by a driving dog.

A first gauging or measuring device 25 is slidably mounted on a support 29 which is secured to the bed 11 and can move in forward and backward directions. The measuring device 25 includes a pair of feelers 27 adapted to come in contact with the periphery of the workpiece W. The pair of feelers 27 are displaced by a servomotor 28 in response to programmed command data so that the point of generation of a sizing signal can be moved. A detailed description of a measuring device suitable for use as the measuring device 25 can be obtained by reference to U.S. Pat. No. 3,568,372.

A second gauging or sizing device 30 for positioning the work table 16 is mounted on a stand 32 which is secured to the bed 11 and has a downwardly directed feeler 31 for moving into contact with an end surface of the workpiece W. The sizing device 30 generates a sizing signal when the feeler 31 is displaced by the end surface of the workpiece W to a position where the end surface is aligned with a left side surface of the wheel 12. It should be understood that the position of the sizing device 30 is compensated for in an amount equal to a dressing amount at every side dressing operation on the wheel 12. In this manner, the relationship between the side surface of the wheel 12 and the point of generation of the sizing signal will be maintained as described above. The sizing device 30 is vertically slidably carried on a slide block 34 that is in turn slidably mounted on a horizontal bar 33 secured to a head 35 on the stand 32. A lead screw, not shown, which is rotatably journalled on the head 35 is engaged with the block 34, and one end of the lead screw is connected with an intermittent drive means housed within the head 35 such that the position of the sizing device 30 will be compensated in accordance with the rotation of the lead screw. The sizing device 30 is also provided with a rack, not shown, which is engaged with a pinion secured to a shaft that is rotatably journalled on the head 35 and connected to a cylinder by way of a rack and pinion arrangement housed in the head 35 so as to move the sizing device 30 up and down in accordance with the operation of the cylinder.

It should be understood that conventional pulse motors are utilized as the servomotors 18, 20, 22, 28, and that the pulse motors are respectively connected to pulse motor drive circuits 41, 42, 43, 44 which are in turn responsive to a conventional numerical control device 40. In this manner, respective movable components are moved in accordance with information stored on a tape 49 which is read by a tape reader 48, and which is transmitted to the numerical control device 40. The numerical control device 40 is further connected to a control device 50 which is provided for stopping the feeding movements of the wheel head 13 and the work table 16 in accordance with the sizing signals. Since the electrical circuits for the control device 50 which are utilized for stopping the feeding movement of the wheel head 13 in accordance with the sizing signal from the measuring device 25 are similar to the electrical circuits which are utilized for stopping the feeding movement of the work table 16 in accordance with the sizing signal from the sizing device 30, only the electrical circuits for positioning the work table 16 will be hereinafter described in reference to FIGS. 3 to 5.

Figure 4:
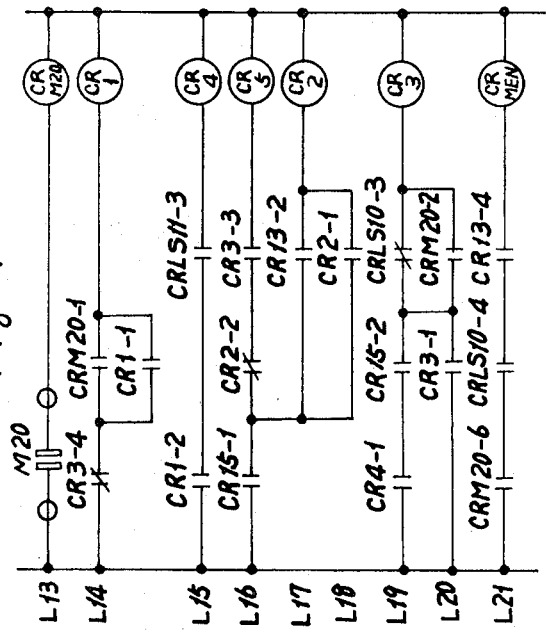
FIG. 4 is a diagram of an electrical circuit for controlling the circuit of FIG. 3; and, FIG. 5 is a diagram of an electrical circuit for controlling the motions of a gauging device.
Figure 5:
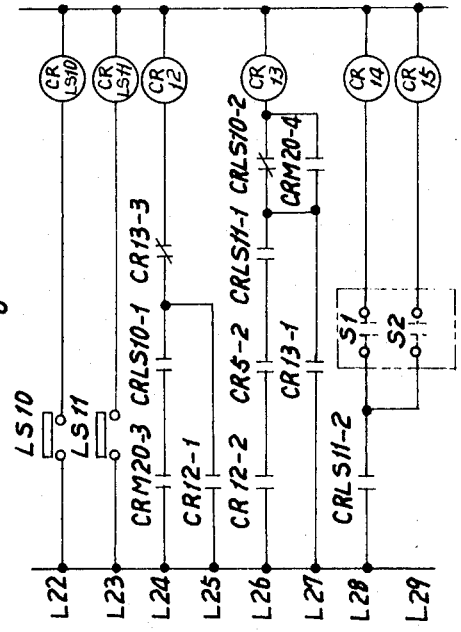
Figure 3:
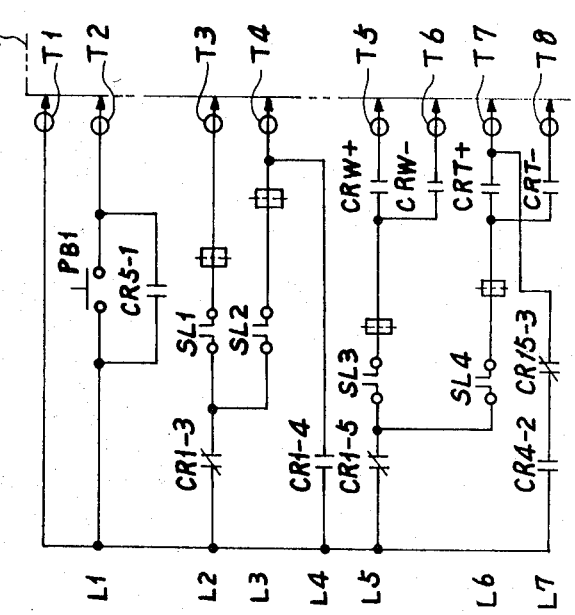
FIG. 3 is an electrical circuit diagram showing a portion of a feed control apparatus.

Referring now to FIGS. 3 to 5, the various horizontal control conductors are for convenience designated as L1 to L29 to enable the electric elements connected thereto to be readily located. Moreover, each relay is represented by a mark CR surrounded by a circle and the contact or contacts of each relay are represented by the same mark as the respective relay together with a contact number. The circuit diagram of FIG. 3 illustrates the connective relationships of the various selection switches and variable resistances for adjusting the frequency of the feed command pulses, and each of the terminals thereof is connected to a terminal of the numerical control device 40 at a mark $\theta$. Since the tape reader 48 and the numerical control device 40 are conventional and may be, for example, the numerical control system manufactured by Fujitsu, Ltd., Kawasaki, Japan, and sold as FANUC MODEL 220, they will be described only in brief.

In FIG. 3, a normally closed contact CR1-3 of a relay CR1 is arranged at line L2, a contact SL1 of a mode selection switch is connected between the contact CR1-3 and a tape or numerical control mode terminal T3 of the numerical control device 40, and the other contact SL2 of the mode selection switch is connected between the contact CR1-3 and a jog mode terminal T4 at line L3. While the tape or numerical control mode terminal T3 is connected to a ground terminal T1 by a closing of the contact SL1, the numerical control device 40 will be in a tape or numerical control mode where it is conditioned to control the machine 10 in accordance with the numerical information transmitted from the tape 49. If the contact SL2 is closed by a manual switchover of the mode selection switch, the jog mode terminal T4 will be connected to the ground terminal T1 and control device 40 will be shifted from the tape or numerical control mode to the jog mode where it is conditioned to release the machine 10 from being numerically controlled. In the tape or numerical control mode, in order to start the machine 10 under the control of the numerical control device 40, a push type button switch PB1 at line L1 or a contact CR5-1 of a relay CR5 must be closed in a short time for connection of a starting terminal T2 with the ground terminal T1. If the relay CR1 is energized, as a contact CR1-4 of the relay CR1 is connected to the jog mode terminal T4 at line L4, the normally closed contact CR1-3 will be opened and the contact CR1-4 will be closed. In accordance therewith, the tape or numerical control mode will be switched off and the jog mode will be automatically switched on. A normally closed contact CR1-5 of the relay CR1, a contact SL3 of a selection switch and a contact CRW+ are serially connected to a wheel head forwarding terminal T5 at line L5, and a contact CRW− is connected to a wheel head retracting terminal T6 in parallel with the contact CRW+. A contact SL4 of the selection switch and a contact CRT+ are provided between the contact CR1-5 and a table right feeding terminal T7 at line L6, and a contact CRT— is connected to a table left feeding terminal T8 in parallel with the contact CRT+. In the jog mode, if the terminal T5 is connected to the ground terminal T1 by a closing of the contacts SL3 and CRW+, then the wheel head 13 will be advanced and when the terminal T6 is grounded by a closing of the contact CRW—, then the wheel head 13 will be retracted. If the contact SL4 is closed because of switchover of the selection switch and the contact CRT+ is closed, then the table right feeding terminal T7 will be grounded, whereby the work table 16 will move in a rightward direction. When the table left feeding terminal T8 is grounded by a closing of the contact CRT—, then the work table 16 will move in a leftward direction. A contact CR4-2 of a relay CR4 and a normally closed contact CR15-3 of a relay CR15, hereinafter described, are connected between the terminals T7 and T1 at line L7, and if the relay CR4 is energized, the terminal T7 will be grounded and the work table 16 will automatically move rightward in a jog mode. A circuit for adjusting the frequency of the feed command pulses in a jog mode is illustrated at lines L8 to L12. A variable resistance VR1 is connected between pulse frequency changing terminals T9 and T10 of the numerical control device 40 by way of a normally closed contact CRM20-4, and a variable resistance VR2 is provided between the terminals T9 and T10 by way of a contact CRM20-5 and a normally closed contact CR14-1. A variable resistance VR3 is arranged between the variable resistance VR2 and the terminal T10 and is connected in parallel with the contact CR14-1. The operation of the circuit will be described hereinafter.

In FIG. 4, a relay CRM20 at line L13 is connected to a miscellaneous function contact M20 provided in the numerical control device 40. The miscellaneous function contact M20 is closed by an end surface positioning command, which is one of the miscellaneous function commands transmitted from the tape 49 and is opened in response to energization of a relay CRMEN, as hereinafter described. The relay CR1 is connected to a normally closed contact CR3-4 and a contact CRM20-1 at line L14. The relay CR1 is energized by a closing of the contact CRM20-1 and is self-held through its contact CR1-1 for automatically changing from a tape or numerical control mode to a jog mode. The relay CR4 at line L15 is energized by closing of a contact CR1-2 of the relay CR1 and a contact CRLS11-3 that is closed when the sizing device 30 is moved to its lowermost position. Contacts CR15-1, CR3-3 and a normally closed contact CR2-2 are provided at line L16 and are connected to the relay CR5. A contact CR13-2 and a relay CR2 are provided in parallel with the serially connected normally closed contact CR2-2, the contact CR3-3 and the relay CR5 at line L17. A contact CR2-1 at line L18 is arranged in parallel with the contact CR13-2. Contacts CR4-1, CR15-2 and a normally closed contact CRLS10-3 are arranged at line L19 and are connected to a relay CR3 for switching off the jog mode. A contact CR3-1 is provided at line L20 in parallel with the contacts CR4-1 and CR15-2 and a contact CRM20-2 is provided at line L20 in parallel with the normally closed contact CRLS10-3. Contacts CRM20-6, CRLS10-4 and CR13-4 are connected at line L21 to the relay CRMEN for signifying completion of the miscellaneous function.

In FIG. 5, a circuit for controlling the motions of the sizing device 30 is illustrated. A relay CRLS10 at line L22 is energized by the closing of a limit switch LS10 when the sizing device 30 is moved to its uppermost position, and a relay CRLS11 at line L23 is energized by the closing of a limit switch LS11 when the sizing device 30 is moved to its lowermost position. Contacts CRM20-3, CRLS10-1 and a normally closed contact CR13-3 are provided at line L24 and are connected to a relay CR12 for enabling a downward movement of the sizing device 30. A contact CR12-1 is provided at line L25 and is arranged in parallel with the contacts CRM20-3 and CRLS10-1. Contacts CR12-2, CR5-2, CRLS11-1, a normally closed contact CRLS10-2 and a relay CR13 are connected in series at line L26 for enabling an upward movement of the sizing device 30. A contact CR13-1 is provided at line L27 and is in parallel with the contacts CR12-2, CR5-2 and CRLS11-1. A contact CRM20-4 is also provided at line L27 and is arranged in parallel with the normally closed contact CRLS10-2. A contact CRLS11-2, a first sizing signal contact S1 of the sizing device 30 and a relay CR14 are connected in series at line L28, and a second sizing signal contact S2 of the sizing device 30 and a relay CR15 are connected to the contact CRLS11-2 at line L29.

The feed control apparatus having a gauging device for a numerically controlled machine tool which is constructed as described above will operate in the following manner. Assuming that the contact SL1 of the mode selection switch is in a closed position, then the previous operation of the machine 10 will have been controlled by the numerical control device 40 in a tape or numerical control mode. Now, the end surface positioning command will be transmitted from the tape 49 after the completion of the previous operation, whereby the contact M20 will be closed and the relay CRM20 will be energized. The relay CR1 will thereby be energized by the closing of the contact CRM20-1 and will be self-held through the contact CR1-1. The normally closed contact CR1-3 at line L2 will be opened and the contact CR1-4 at line L4 will be closed, whereby the tape or numerical control mode will be switched off and the jog mode will be switched on. Since the sizing device 30 will be at its uppermost position, the relay CRLS10 will be energized through the limit switch LS10. The relay CR12 will therefore be energized by way of the contacts CRM20-3 and CRLS10-1, and the sizing device 30 will move downward. When the sizing device 30 arrives at its lowermost position, the limit switch LS11 will be closed and the relay CRLS11 will be energized. The relay CR4 at line L15 will therefore be energized by the closing of the contact CRLS11-3. Since the contact CR4-2 of the relay CR4 at line L7 will be closed, the work table 16 will begin to move in a rightward direction. The normally closed contact CRM20-4 at line L8 will be opened and the contact CRM20-5 will also be closed, whereby the variable resistance VR2 will be connected between the pulse frequency changing terminals T9 and T10. In accordance with the above, the high speed feeding movement of the work table 16 will be carried out by the feed command pulses at a frequency which corresponds to the resistance VR2. When the feeler 31 is displaced a given amount by the end surface of the workpiece W, the first sizing signal contact S1 will be closed, and the relay CR14 will be energized. Since the normally closed contact CR14-1 at line L12 will be opened, the variable resistances VR2 and VR3 will be connected in series between the terminals T9 and T10 so that the work table 16 will be moved at a low speed. Now, when the end surface becomes aligned with a left side surface of the wheel 12, the second sizing signal contact S2 will be closed, and the relay CR15 will be energized. The normally closed contact CR15-3 of the relay CR15 at line L7 will be opened, so that movement of the work table 16 will be immediately stopped. At the same time the contact CR15-2 at line L19 will be closed, so that the relay CR3 will be energized and self-held by the contact CR3-1. The contact CR3-4 at line L14 will be opened to thereby deenergize the relay CR1, so that the jog mode will switch over to tape or numerical control mode. The relay CR5 will be energized through the contacts CR15-1 and CR3-3 so as to close the contact CR5-1 at line L1. Since the contact CR5-2 at line L26 is also closed, the relay CR13 will be energized and self-held through the contact CR13-1. Subsequently, the relay CR2 will be energized through the contact CR13-2 and self-held through the contact CR2-1 so as to open the normally closed contact CR2-2 at line L16. The relay CR5 will be deenergized and the contact CR5-1 at line L1 will be opened. Because of the short time of closing of the contact CR5-1, the numerical control device 40 will start its control over the machine 10 in a tape or numerical control mode. However, since a signal for signifying completion of a miscellaneous function will not yet be generated, the tape 49 will not be fed for the next information block. Since the relay CR13 will be energized, the sizing device 30 will move upward, and when it arrives at the uppermost position, the limit switch LS10 will be operated, and the relay CRMEN will be energized through the contacts CRLS10-4 and CR13-4. Because of the energization of the relay CRMEN, the contact M20 will be opened and the relay CRM20 will be deenergized. The contact CRM20-6 at line L21 will then be opened and the relay CRMEN will thereby be deenergized. The deenergization of the relay CRMEN will signify completion of a miscellaneous function and the tape 49 will then be fed for the next data block.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by letters patent of the United States is:

1. In a numerically controlled machine tool controlled by numerical control means; a feed control apparatus comprising:

gauging means having a feeler means for making contact with a workpiece, said gauging means generating a sizing signal when at least one machine movable component is moved to a desired position from a position remote from said workpiece, said gauging means further being movable between a rest position and a measuring position; and sequence control means coupled to said numerical control means and said gauging means, said control means having a first relay energized in accordance with a closing of a miscellaneous function contact of said numerical control means, a second relay energized upon energization of said first relay and movement of said gauging means to said measuring position, a third relay energized in accordance with said sizing signal from said gauging means, a fourth relay energized upon energization of said third relay, a first contact means operably connected to said first means for changing said numerical control means from a numerical control mode operation to a jog mode operation in accordance with energization of said first relay, a second contact means associated with said second relay for causing said numerical control means to generate feed command pulses for moving said at least one machine movable component in accordance with energization of said second relay, third contact means associated with said third relay for stopping the movement of said at least one machine movable component and a fourth contact means operably connected to said fourth relay for initiating the starting of the numerical control mode operation by said numerical control means, whereby the numerically controlled machine tool is controlled by a reduced amount of numerical control information.

2. In a numerically controlled machine tool controlled by numerical control means; a feed control apparatus comprising:

gauging means having feeler means for making contact with a workpiece mounted on a movable component of said machine tool, said gauging means having a sizing signal contact that is closed when said feeler means is moved to a desired position, said gauging means further being movable between a rest position and a measuring position; and, sequence control means coupled to said numerical control means and said gauging means, said control means having a first relay energized in accordance with a closing of a miscellaneous function contact of said numerical control means, a second relay energized upon energization of said first relay and movement of said gauging means to said measuring position, a third relay connected to said sizing signal contact, a fourth relay energized upon energization of said third relay, said first relay being deenergized upon energization of said third relay, a normally closed contact of said first relay being connected to a numerical control mode terminal of said numerical control means, a contact of said first relay being connected to a jog mode terminal of said numerical control means, a contact of said second relay and a normally closed contact of said third relay being connected in series to a feeding terminal of said numerical control means, a contact of said fourth relay being connected to a starting terminal of said numerical control means whereby the numerically controlled machine tool is controlled by a reduced amount of numerical control information.

3. A feed control apparatus as set forth in claim 2, wherein said control means further includes a fifth relay connected to said contact of said third relay in parallel with said fourth relay, a normally closed contact of said fifth relay being connected to said fourth relay.

4. A feed control apparatus as set forth in claim 3, wherein said control means still further includes a sixth relay connected to said miscellaneous function contact, a seventh relay connected to a contact of said third relay, a normally closed contact of said seventh relay and a contact of said sixth relay being connected in series to said first relay, and a contact of said seventh relay being connected to said fourth relay.

5. A feed control apparatus as set forth in claim 4, wherein said gauging means further includes another sizing signal contact that is closed when said feeler means is moved to a position that is a predetermined distance away from said desired position, and wherein said control means further includes an eighth relay connected to said another sizing signal contact, a first resistance connected between pulse frequency changing terminals of said numerical control means by way of a contact of said sixth relay and a normally closed contact of said eighth relay, and a second resistance connected to said first resistance in parallel with said normally closed contact of said eighth relay.

6. In a numerically controlled machine tool controlled by numerical control means; a feed control apparatus comprising;
gauging means having feeler means and generating a sizing signal when at least one machine movable component is moved into a desired position;
sequence control means for controlling miscellaneous functions and comprising first means for changing in accordance with the numerical information of said numerical control means from a numerical control mode operation to a jog mode operation;
second means operably connected to said first means and causing said numerical control means to generate feed command pulses for moving said at least one machine movable component:
third means responsive to said sizing signal from said gauging means for stopping the movement of said at least one machine movable component; and,
fourth means operably connected to said third means and for changing said numerical control means from said jog operation to said numerical control operation whereby the numerically controlled machine tool is controlled by a reduced amount of numerical control information.

7. In a numerically controlled machine tool controlled by numerical control means; a feed control apparatus comprising:
gauging means having feeler means for making contact with a workpiece, said gauging means generating a sizing signal when at least one machine movable component is moved to a desired position, said gauging means further being movable between a rest position and a measuring position; and,
sequence control means coupled to said numerical control means and said gauging means, said control means having a first means energized in accordance with numerical information of said numerical control means for changing said numerical control means from a numerical control mode operation to a jog mode operation, a second means energized upon energization of said first means and movement of said gauging means to said measuring position for causing said numerical control means to generate feed command pulses for moving said at least one machine movable component, a third means energized in accordance with said sizing signal from said gauging means for stopping the movement of said at least one machine movable component, and fourth means energized upon energization of said third means for changing said numerical control means from said jog mode operation to said numerical control operation whereby the numerically controlled machine tool is controlled by a reduced amount of numerical control information.

8. A feed control apparatus according to claim 7, wherein said first, second, third and fourth means are relay coils and contacts associated therewith.

* * * * *